May 12, 1936.                B. JORGENSEN                2,040,138
METHOD AND MACHINE FOR USE IN LASTING SHOES
Filed Oct. 29, 1934     10 Sheets-Sheet 1

INVENTOR.
Bernhardt Jorgensen,
By his Attorney,
Harlow M. Davis

May 12, 1936.  B. JORGENSEN  2,040,138
METHOD AND MACHINE FOR USE IN LASTING SHOES
Filed Oct. 29, 1934  10 Sheets-Sheet 4

INVENTOR
Bernhardt Jorgensen
By his Attorney
Harlow M. Davis

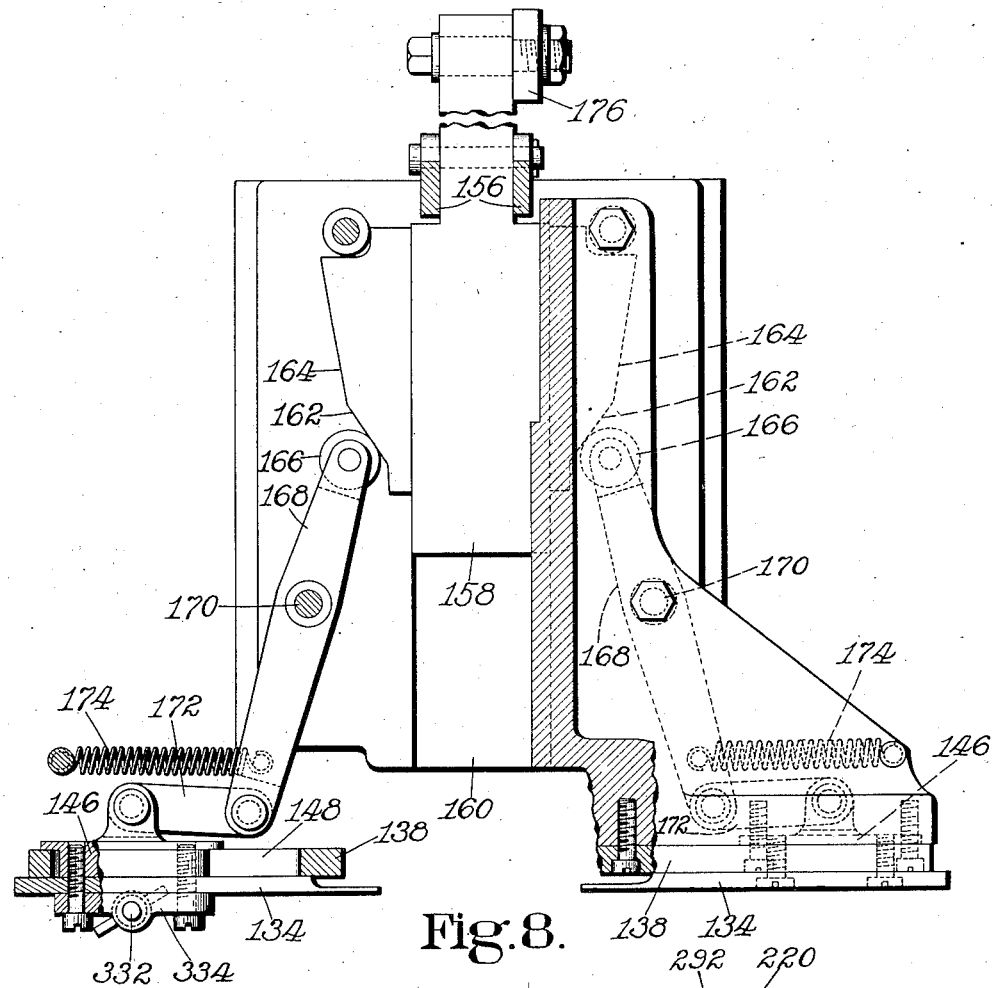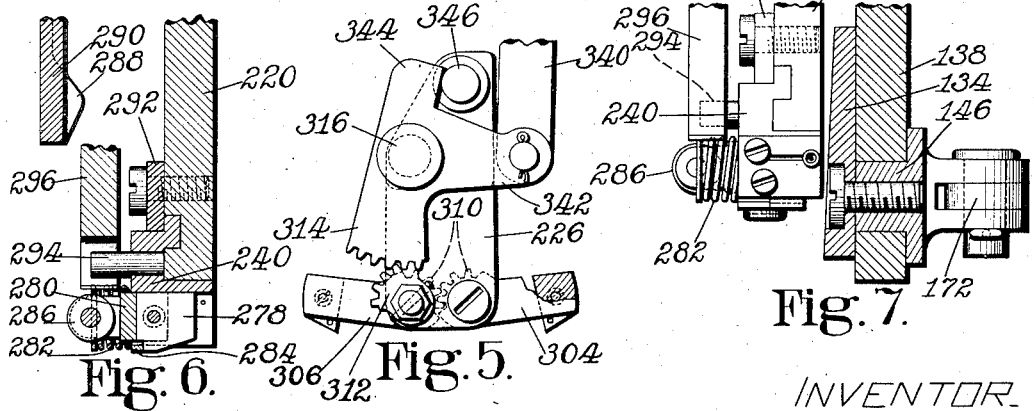

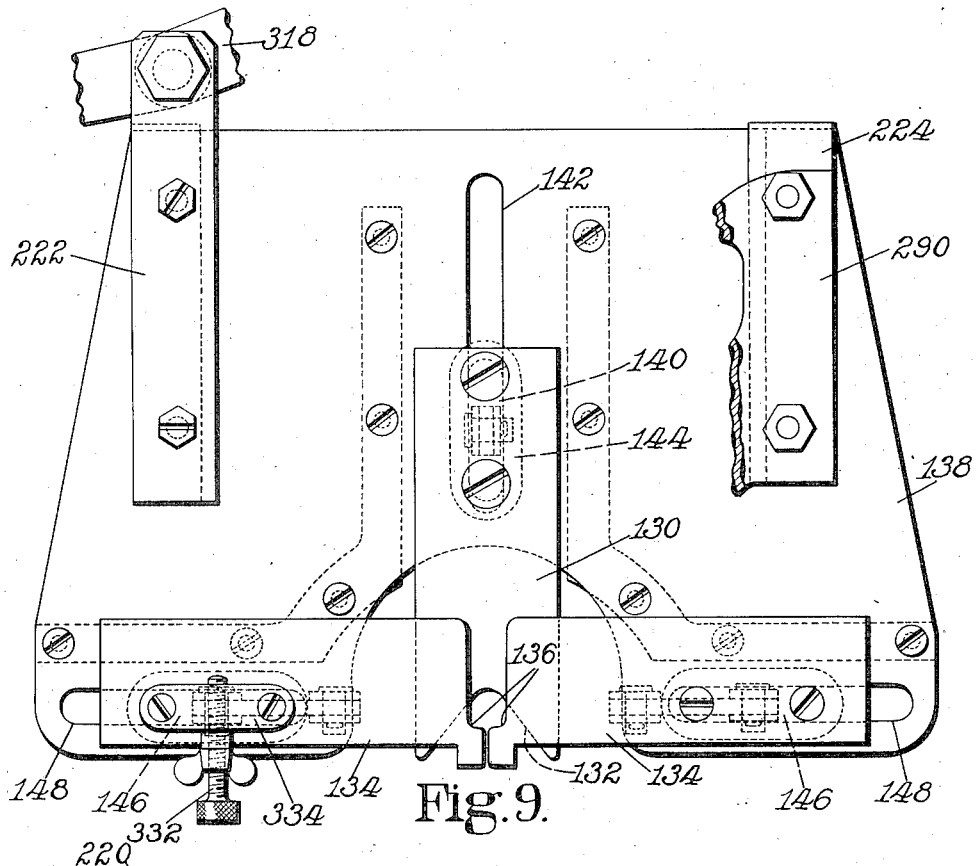
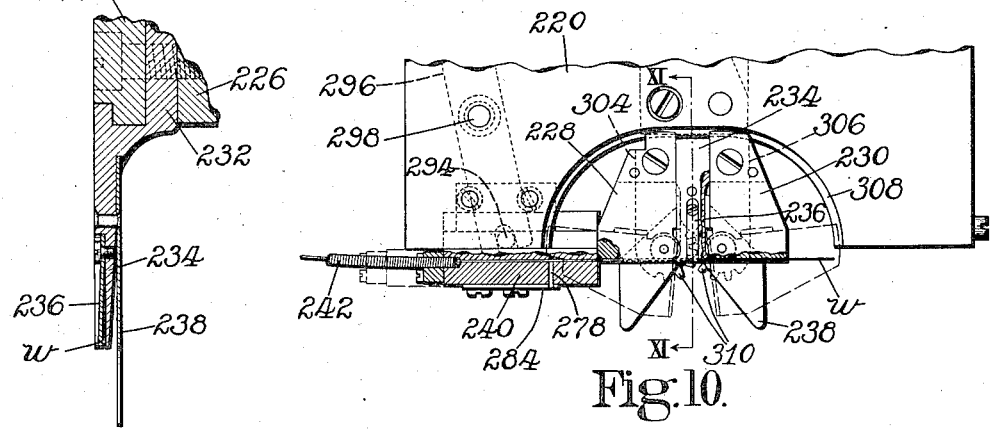

May 12, 1936.  B. JORGENSEN  2,040,138
METHOD AND MACHINE FOR USE IN LASTING SHOES
Filed Oct. 29, 1934  10 Sheets-Sheet 8
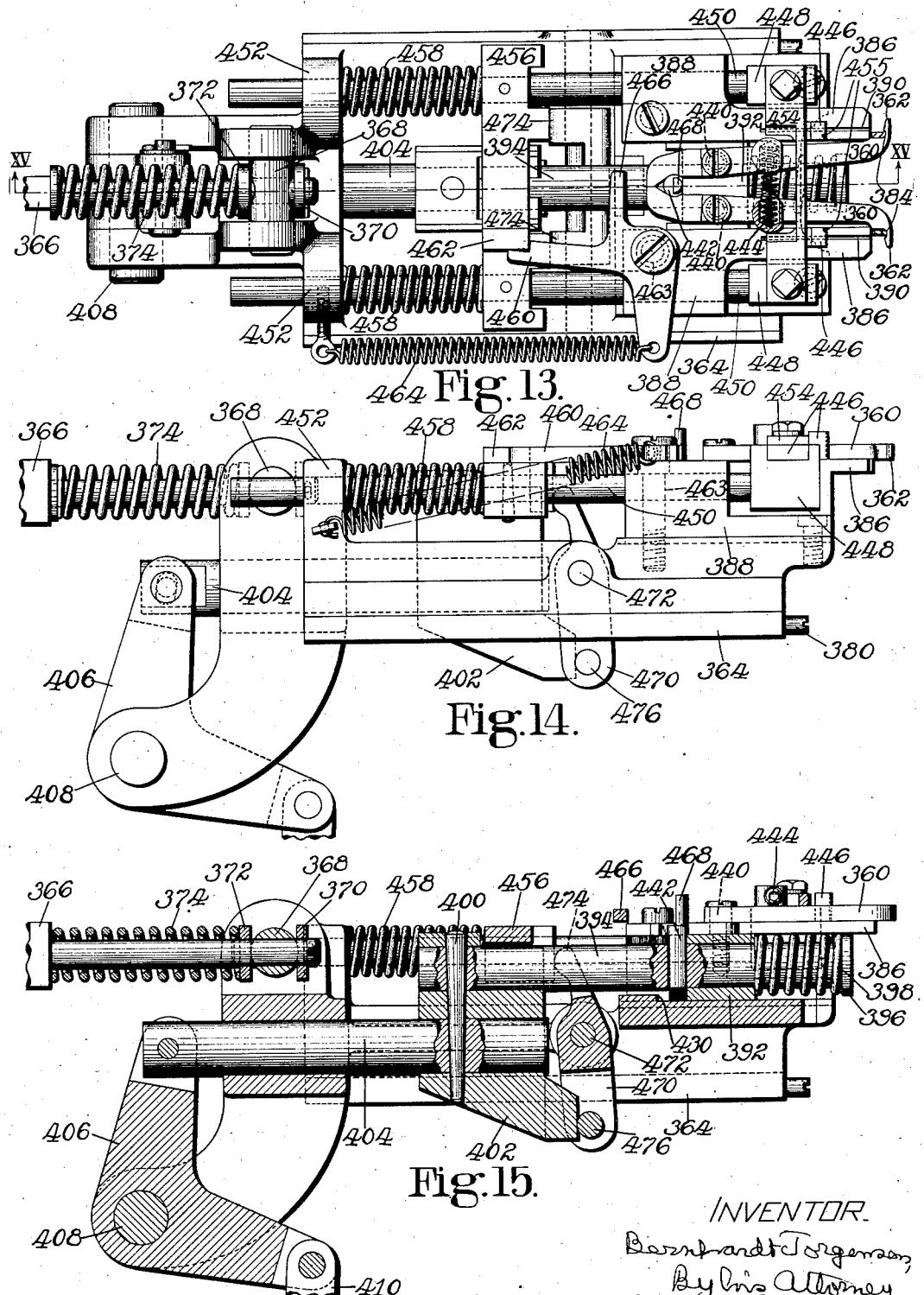

May 12, 1936.  B. JORGENSEN  2,040,138
METHOD AND MACHINE FOR USE IN LASTING SHOES
Filed Oct. 29, 1934  10 Sheets-Sheet 9
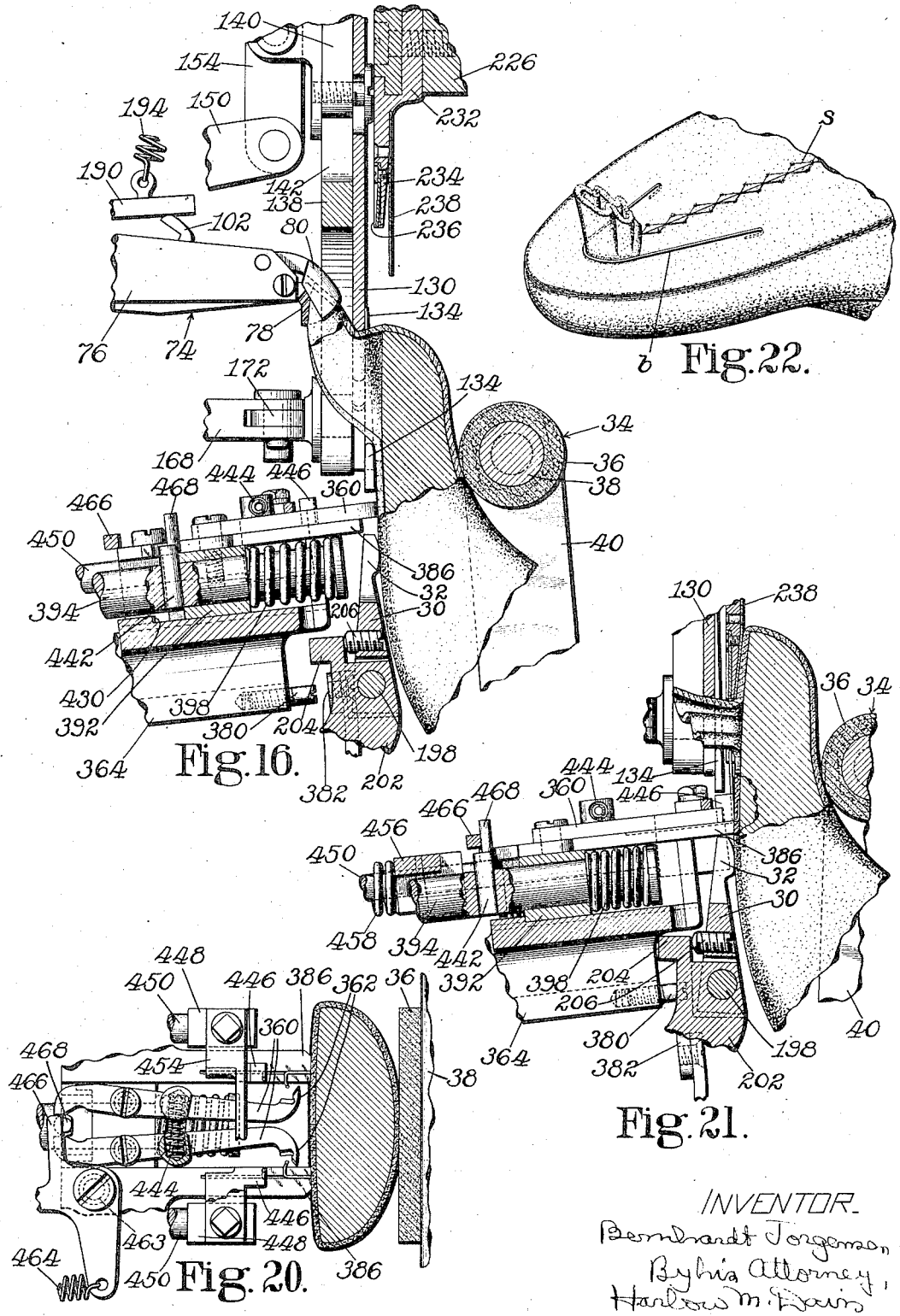

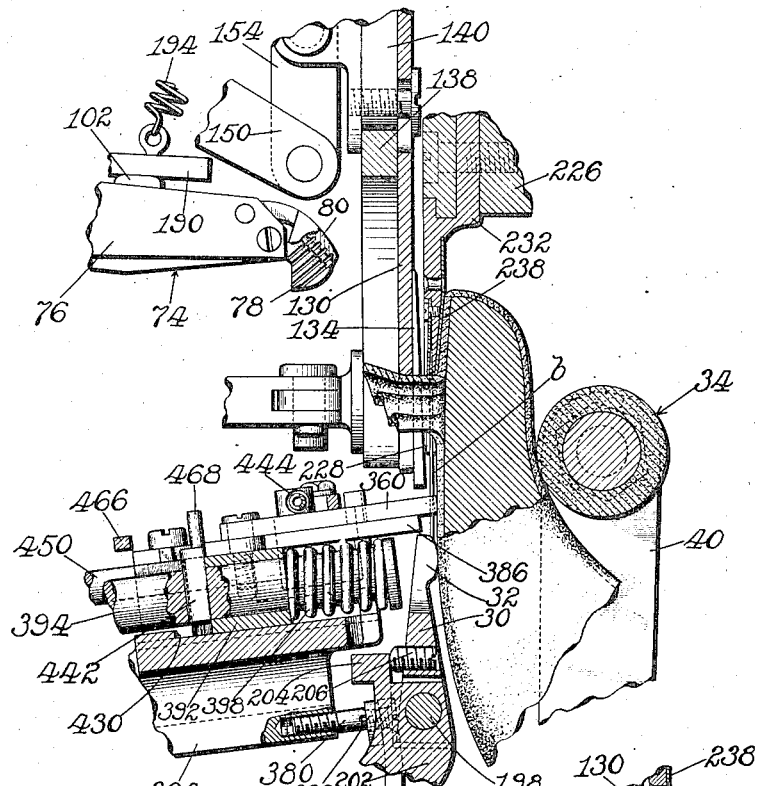
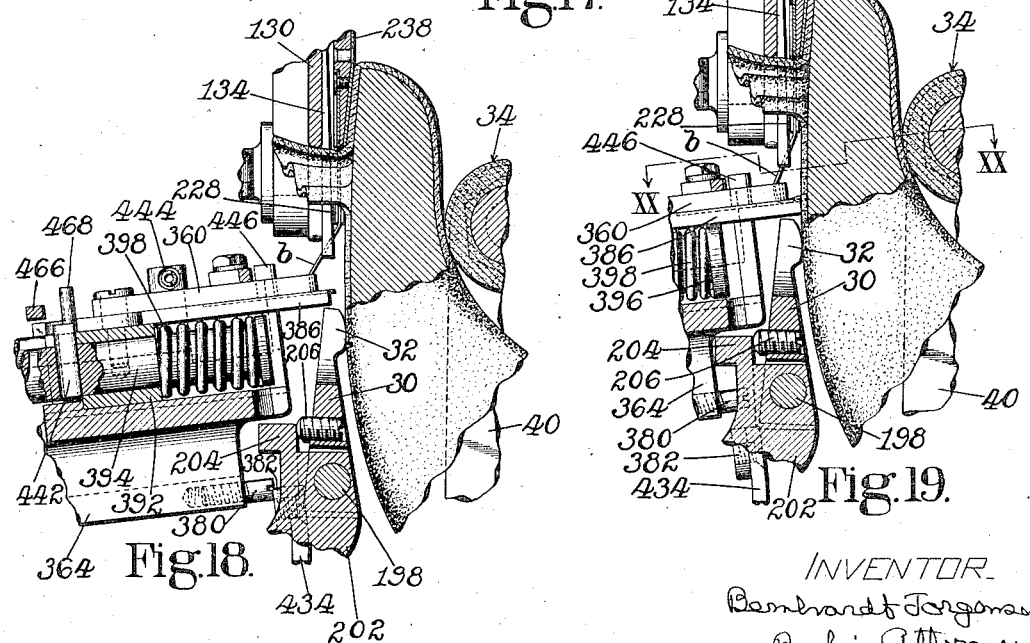

Patented May 12, 1936

2,040,138

UNITED STATES PATENT OFFICE 2,040,138

METHOD AND MACHINE FOR USE IN LASTING SHOES

Bernhardt Jorgensen, Beverly, Mass., assignor to United Shoe Machinery Corporation, Paterson, N. J., a corporation of New Jersey Application October 29, 1934, Serial No. 750,413

41 Claims. (Cl. 12—14)

This invention relates to the lasting of shoes, and is herein illustrated as applied to the lasting of the toes of felt shoes of a well-known type. It is to be understood, however, that in various aspects it is not limited to the manufacture of shoes of that particular kind nor to the lasting of the toe ends of shoes.

In the manufacture of shoes of the above-mentioned type it is the practice to provide an upper of such extent as to overlap the bottom of the last in place of an insole, and to stitch the lower edges of the upper either directly together or to an insert, except at the toe portion, before mounting the upper on a last. After the upper has been dampened and a last inserted, the toe is lasted by tensioning the upper, gathering its margin over the bottom of the last and fastening the gathered margin to hold it until the felt has dried.

In United States Letters Patent No. 1,754,272, granted on April 15, 1930 upon an application of mine, there is disclosed a method whereby the margin of the toe end of the upper of a felt shoe, gathered as above described, is fastened by applying a binder around it, thus overcoming such objections as there may be to the use of tacks for that purpose. The present invention, in one aspect, provides a method whereby the margin of the upper is fastened by a binder and the binder is anchored to the shoe in a novel manner. As herein illustrated, the ends of a wire binder applied to the gathered margin of the upper are forced through the felt upper and against the bottom face of the last so as to be clinched by the last, the binder accordingly being anchored to the felt upper only. The binder is thus secured effectively in upper-holding position without the necessity of driving any fastenings such as tacks into the shoe and last. Notwithstanding the fact that the ends of the binder are clinched as above described, it may readily be removed from the shoe when desired, since the clinched ends of soft wire such as customarily used for toe binders will readily yield to a pull applied heightwise of the last without tearing the upper.

The invention further provides improvements in lasting machines, herein shown as embodied in a novel machine organization particularly adapted for lasting the toes of felt shoes. One feature comprises novel means for applying and fastening a binder to a shoe in accordance with the above described method. For the purposes in view the construction shown comprises means for bending the ends of a binder, after the binder has been applied to the gathered margin of the upper, so that the binder ends are directed heightwise of the shoe, and means for driving the bent ends into the shoe and against the bottom face of the last so that the ends are clinched by contact with the last. Preferably, as illustrated, the ends of the binder are so bent and driven that they are clinched by the last forwardly toward the end of the toe. A novel organization of means is further provided for feeding binder wire, severing therefrom a portion to serve as a binder, and applying the binder to the gathered margin of the upper.

A further feature of the invention comprises novel end wiper mechanism for wiping the upper over the bottom of the last and gathering its margin in upstanding relation to the last bottom. For this purpose the construction shown comprises an end wiper plate movable lengthwise of the shoe and side wiper plates rectilinearly movable laterally of the shoe in overlapping relation to the end wiper plate, the upper-engaging portions of the several plates being so formed as to gather the margin of the toe end of the upper within a comparatively small area substantially midway between the opposite sides of the toe of the shoe. The binder-applying means is movable inwardly between these wipers and the bottom of the last, and in order to provide room for it to operate in this manner the machine further includes means for moving the forepart of the last a short distance heightwise away from the wipers near the end of the operative movements of the wipers. In accordance with still another feature of the invention, there is provided additional means for pressing the portion of the upper wiped inwardly by the wipers close to the bottom of the last in the binder-applying operation, after such relative separating movement of the wipers and the last.

The novel method and features of the machine organization, including various novel details of construction and combinations of parts, will now be more particularly described by reference to the accompanying drawings and pointed out in the claims.

In the drawings,

Fig. 3a shows the upper-pulling gripper partly in side elevation and partly in section;

Fig. 5 is a view in front elevation of a portion of the binder-applying means, with the parts in different positions than in Fig. 2;

Fig. 6 is a section on the line VI—VI of Fig. 4;

Fig. 7 is a section on the line VII—VII of Fig. 4;

Fig. 8 is a view partly in plan and partly in section, showing mainly the side toe wipers and their operating means;

Fig. 9 shows the toe wipers and associated parts of the structure in front elevation, with the wipers in the positions which they occupy at the end of their wiping movements;

Fig. 10 shows a portion of the binder-applying means as viewed from the rear, with parts broken away;

Fig. 11 is a section on the line XI—XI of Fig. 10;

Fig. 13 is a plan view of a portion of the binder-fastening means;

Fig. 14 is a view in side elevation of the structure shown in Fig. 13;

Fig. 15 is a section on the line XV—XV of Fig. 13;

Figs. 16, 17, 18 and 19 are sectional views illustrating the positions of various parts at different stages in the operation of the machine;

Fig. 20 is a section on the line XX—XX of Fig. 19;

Fig. 21 is a view similar to Fig. 19, but showing the parts as positioned at a still later stage in the operation; and Fig. 22 is a perspective view of the toe end of the shoe after it has been operated upon by the machine.

Figure 1:
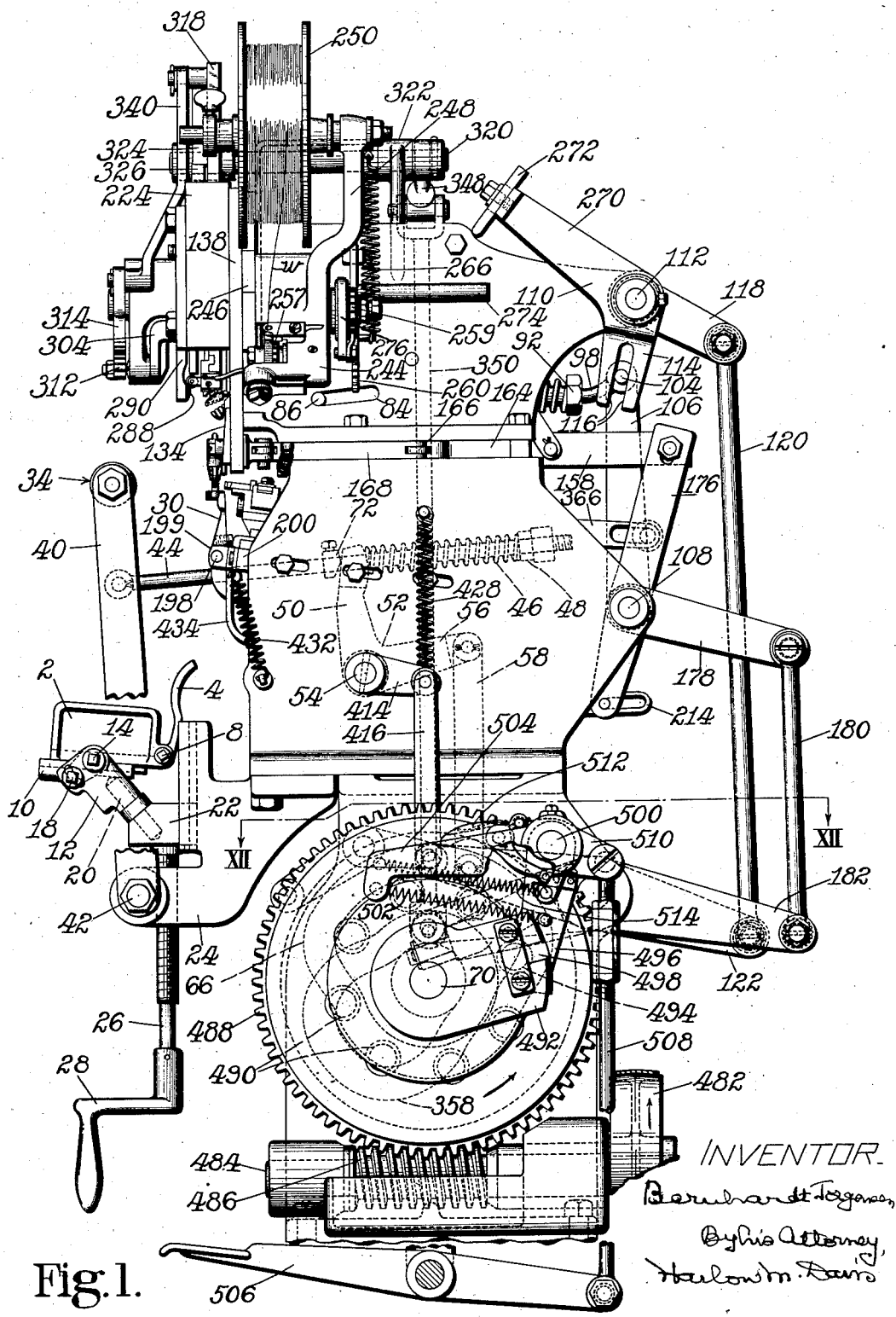
Fig. 1 is a view in right-hand side elevation of the upper portion of a machine in which features of the invention are embodied, with parts broken away.

The invention is illustrated by reference to the lasting of the toe of a felt shoe the opposite side portions of the upper of which are secured directly together over the bottom of the last by stitches s (Fig. 22). These stitches, as above suggested, terminate at a considerable distance from the end of the toe, so that the toe portion of the upper must be shaped in better conformity to the contour of the last and its margin fastened in lasted position over the bottom of the last after the last has been inserted in the stitched upper. For the toe-lasting operation, in the machine herein shown, the last and shoe (hereinafter frequently referred to inclusively as the shoe) are supported at the heel end on a V-shaped heel rest 2 provided with an arm 4 arranged to engage the bottom face of the shoe at or near the heel end, this arm being adjustable about a rod 6 which extends laterally of the shoe and is threaded at one end in the heel rest 2. The rod 6 has a head 8 (Fig. 1) thereon for turning it and serves to clamp the arm 4 in adjusted position between parts of the heel rest. The heel rest is freely movable in directions heightwise of the shoe along a guideway provided in a holder 10, this holder being mounted for adjustment about an axis extending laterally of the shoe on a bracket 12. For this purpose there are provided screws 14 and 16 which are threaded in the holder and are swiveled in the bracket 12. The holder is secured in adjusted position by a clamping screw 18 threaded therein and extending through a slot in the bracket 12. This bracket is supported on a pair of pins, one of which is shown at 20 in Fig. 1, these pins being mounted in a carrier 22 adjustable vertically along guideways on a bracket 24 which is fast on the frame of the machine. Such adjustment of the carrier 22 and the parts supported thereon is effected by a spindle 26 threaded in the bracket 24 and swiveled at its upper end in the carrier 22, the spindle having a hand crank 28 on its lower end for turning it. It will thus be seen that the means for supporting and positioning the heel end of the shoe is movable in various ways to position the toe end of the shoe in proper relation to the parts which operate thereon. Sliding movements of the heel rest 2 in opposite directions relatively to the holder 10 are limited by engagement of the head 8 of the threaded rod 6 with the bracket 24 and with a portion of the holder 10 in which the screw 14 is mounted.

Figure 12:
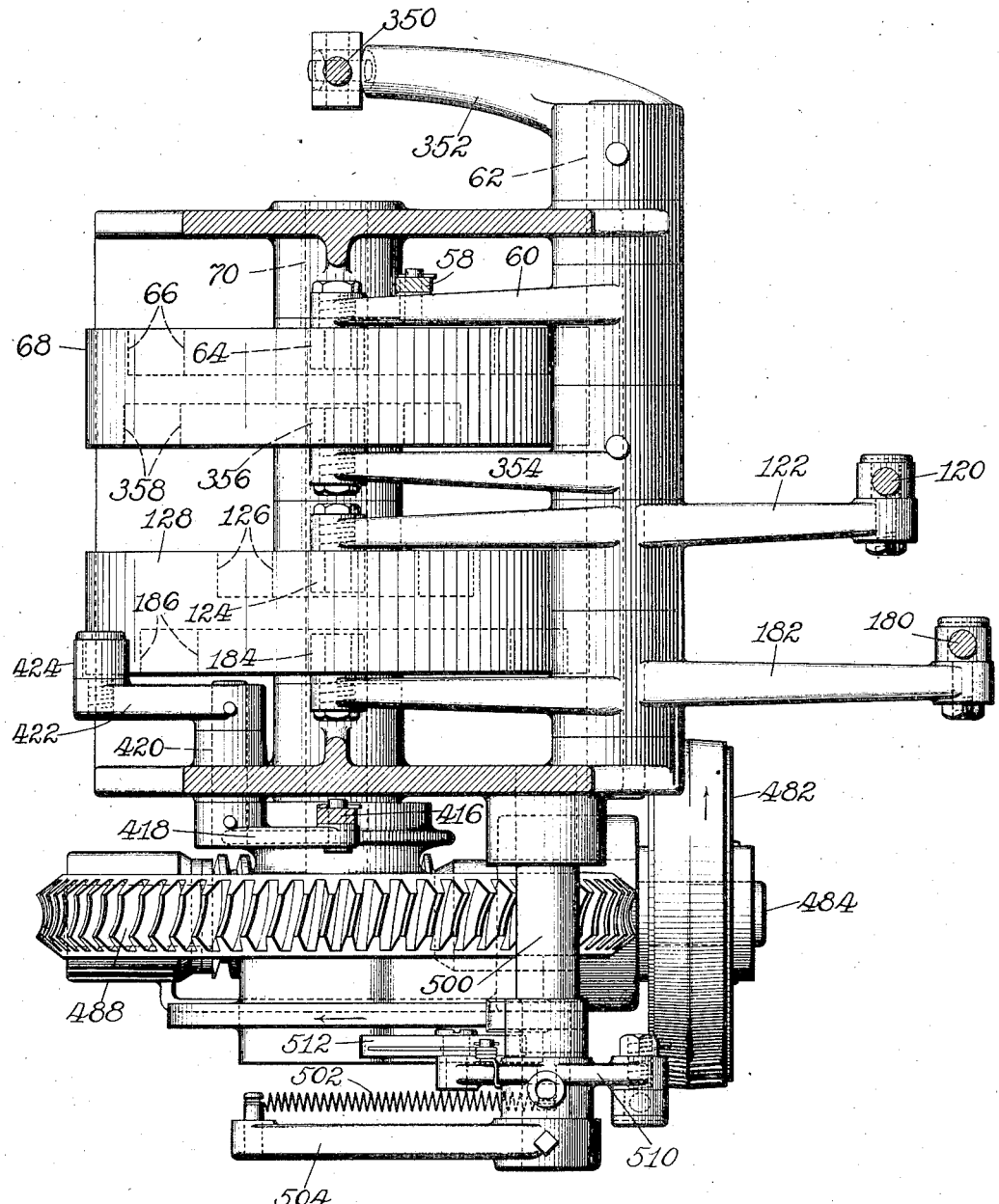
Fig. 12 is a section on the line XII—XII of Figs. 1 and 2.

The shoe, when supported at the heel end as above described, is positioned with the bottom of its forepart at the rear of its toe portion in engagement with a bottom rest 30 which is mounted and controlled as hereinafter described and is provided with two fingers 32 spaced apart widthwise of the shoe. The forepart of the shoe is clamped against these fingers in the course of the operation of the machine by a shoe holder 34 comprising a rubber sleeve 36 mounted on a rod 38 which is secured to the upper ends of a pair of downwardly extending bars 40. At their lower ends the bars 40 are secured to the opposite ends of a rod 42 mounted to turn in a bearing in the bracket 24, so that there is provision for swinging movement of the shoe holder 34 in directions heightwise of the shoe. For swinging the holder from its idle position (Fig. 3) into position to clamp and hold the shoe, there is pivotally connected to one of the bars 40 a rod 44 (Fig. 1) having thereon a spring 46 engaged at one end by a nut 48 on the rod and engaged at its opposite end by a forked arm 50 of a bell-crank lever 52 mounted to turn about a shaft 54 supported on the frame of the machine. The other arm 56 of the bell-crank lever 52 is connected by a link 58 to an arm 60 (Fig. 12) which is mounted to turn about a shaft 62 and carries a roll 64 engaged by a path cam 66 formed in one side of a cam wheel 68, this cam wheel being fast on a cam shaft 70 operated as hereinafter described. It will be understood that the bell-crank lever 52 is swung in a clockwise direction (Fig. 1) by downward movement of the link 58 and acts through the spring 46 and the rod 44 to swing the shoe holder 34 into engagement with the shoe at the top of the forepart and to press it yieldingly against the shoe through compression of the spring. When the bell-crank lever is swung in the opposite direction its arm 50 acts on a stop 72 on the rod 44 to swing the shoe holder away from the shoe.

For pulling the upper over the toe end of the last the machine is provided with a single gripper 74 (Figs. 3 and 3a) which grips the upper at the end of the toe. This gripper is constructed to operate in substantially the same manner as disclosed in Letters Patent No. 1,030,264, granted on June 18, 1912 upon an application of R. F. McFeely, and accordingly it is not herein shown in complete detail. It comprises a casing 76 to which is secured a gripper jaw 78 and to which is pivoted another gripper jaw 80 for movements toward and from the jaw 78. Slidingly mounted in the casing 76 is a bar 82. In the pulling of the upper the gripper is guided by slots 84 in the frame of the machine into which extend pins 86 on the opposite sides of the casing 76, these slots being so inclined that the gripper has a component of upward movement lengthwise of the last during its rearward movement heightwise of the last. Within the casing 76 there is means (not shown) of substantially the same construction as disclosed in the above-mentioned Letters Patent, whereby the gripper jaw 80 is swung to an open position by forward movement of the bar 82 relatively to the casing 76 when the casing is held at the limit of its movement in that direction by the pins 86 in the slots 84, and whereby the jaw 80 is swung into position to grip the upper against the jaw 78 as the bar 82 is moved rearwardly before the casing 76 starts to move in that direction, the casing being thereafter operated by further rearward movement of the gripper bar to cause the jaws to pull the upper. In the construction herein shown such rearward movement of the bar 82 is effected through a spring 90 mounted on a tubular portion of the bar and engaging a nut 92 on the rear end of the bar to operate the latter, the spring being engaged at its front end by a collar 94 mounted to slide on the bar 82 and connected by a pin 96 to a rod 98 which is slidingly movable in the tubular portion of the bar. Formed in this portion of the bar are slots 100 through which the pin 96 extends, these slots affording provision for movement of the collar 94 along the bar against the resistance of the spring 90 in the pulling of the upper. By engaging the bar 82 at the front ends of the slots 100 the pin 96 serves to return the gripper to its starting position. The gripper is further provided with a tripping finger 102 through depression of which by means hereinafter described the gripper jaws are caused to release the upper in the manner disclosed in the above-mentioned Letters Patent No. 1,030,264.

To assist in supporting the gripper the rod 98 is pivotally mounted at its rear end on a pin 104 supported on the upper end of an arm 106 which is mounted to swing idly on a shaft 108 on the frame of the machine. The rod 98 is operated for the purposes above described through a bell-crank lever 110 fast on a rock-shaft 112 on the frame, this bell-crank lever having a depending arm 114 provided with a slot 116 into which the pin 104 extends. Also fast on the rock-shaft 112 is an arm 118 connected by a link 120 to a lever 122 which is mounted to turn on the previously mentioned shaft 62 and carries a roll 124 (Fig. 12) engaged by a path cam 126 formed in a cam wheel 128 on the shaft 70. It will thus be seen that by upward movement of the link 120 movement toward the left (Fig. 3) is imparted to the rod 98 to cause the gripper jaws to grip the upper and to operate the gripper to pull the upper as hereinabove described, and that by downward movement of the link the rod is moved reversely to return the gripper to its starting position and to open the jaws.

After the upper has been pulled by the gripper it is wiped inwardly over the bottom of the last and its free margin is gathered within a comparatively small area by toe-lasting wipers. These wipers (Fig. 9) comprise an end wiper plate 130 movable vertically in a rectilinear path and having a substantially V-shaped recess 132 at its lower end, and a pair of side wiper plates 134 movable horizontally in rectilinear paths at right angles to the path of movement of the plate 130 and having recesses 136 therein arranged to register with the inner portion of the V-shaped recess 132 when the wipers are at the limits of their wiping movements, as illustrated in Fig. 9, portions of the plates 134 being arranged to overlap the front face of the plate 130. It will thus be seen that the three plates cooperate to gather the upstanding margin of the upper within a small area substantially midway between the opposite sides of the toe and that they substantially inclose the gathered margin on all sides at the end of the wiping operation. The wiper plate 130 is movable in sliding engagement with a fixed vertical frame plate 138 and is secured adjustably to a block 140 (Fig. 3) guided by a slot 142 in this plate, the block being provided with a flange 144 which overlaps the rear face of the plate 138. Similarly each of the side wiper plates 134 is movable in sliding engagement with the plate 138 and is secured to a block 146 (Fig. 8) guided by a slot 148 in the plate. Operative movements are imparted to the wiper plate 130 through a lever 150 (Fig. 3) fast on a rock shaft 152 on the frame and connected at its front end by a link 154 to the block 140. At its rear end the lever 150 is connected by a pair of links 156 (Figs. 3 and 8) to a slide 158 horizontally movable forwardly and rearwardly along a guideway 160 in the frame of the machine. On its opposite sides the slide 158 is provided with cam faces 162 and 164 arranged to act on rolls 166 which are mounted on the rear ends of levers 168 fulcrumed on rods 170 on the frame, these levers being connected at their front ends by links 172 to the blocks 146 on which the side wiper plates 134 are secured. It will thus be seen that as the slide 158 is moved forwardly the lever 150 is operated through the links 156 to impart downward movement to the end wiper plate 130 and the levers 168 are operated by the cam faces 162, 164 to impart inward movements to the side wiper plates 134. It will be observed that the cam faces 162 and 164 are arranged in different angular relations to the path of movement of the slide 158, so that there are first imparted to the side wiper plates 134 comparatively quick inward movements to operating positions by the cam faces 162, followed by slower inward movements effected by the cam faces 164 in the wiping operation. Similarly the end wiper plate 130 receives at first a comparatively quick downward movement followed by a slower movement as the links 156 approach positions more nearly perpendicular to the path of movement of the slide 158. The operative movements of the levers 168 are effected against the resistance of springs 174 by which the side wiper plates are returned to their starting positions upon retractive movement of the slide 158.

For moving the slide 158 to operate the wipers as above described there is provided a lever 176 (Fig. 3) fast on the previously mentioned shaft 108 which is mounted for turning movements, this lever having a pin-and-slot connection with the slide 158. Also fast on the shaft 108 is an arm 178 connected by a link 180 to a lever 182 which is mounted to turn on the shaft 62 and is provided at its front end with a roll 184 (Fig. 12) engaged by a path cam 186 formed in one side of the cam wheel 128.

At a predetermined time in the operation of the toe wipers, after they have begun to wipe the upper inwardly over the bottom of the last, the gripper is caused to release the upper. For this purpose there is pivotally mounted on a rod 188 on the frame (Fig. 3) a plate 190 arranged to overlie the tripping member 102 on the gripper and movable downwardly to operate this member and thus to cause the gripper jaws to release the upper, as illustrated in Fig. 17. The plate 190 is held initially in an upraised position determined by a stop pin 192 by means of a spring 194. For swinging the plate downwardly to operate the member 162 there is provided a member 196 secured to the rock shaft 152 to turn therewith and arranged to act as a cam on the upper face of the plate 190.

Near the end of the operative movements of the toe wipers the shoe is swung a short distance in a forward direction relatively to the wipers to provide more room between the wipers and the bottom of the last for the operation of the means hereinafter described for applying a binder to the gathered margin of the upper. Such forward movement of the shoe is effected by swinging movement of the shoe bottom rest 30 previously referred to as having spaced fingers 32 for engaging the shoe bottom. For this purpose the member 30 is pivotally mounted on a pin 198 (Figs. 1 and 3) supported in lugs 199 on the forward end of a plate 200 (Figs. 2 and 4) which is secured to the frame of the machine. Also pivotally mounted on the pin 198 is a lever 202 provided with a lug 204 (Fig. 16) arranged to engage a screw 206 threaded in the member 30 and thus to swing the member forwardly as above described. It will be evident that the screw 206 affords provision for adjustment of the position of the member 30 relatively to the lever 202 to vary the relation of the bottom of the last to the wipers 130 and 134. While the member 30 may swing forward relatively to the lever 202 when no shoe is against it, such movement of the member is limited by contact of portions thereof with the lever. The rear end of the lever 202 is connected by a link 208 (Fig. 3) to one arm of a lever 210 fulcrumed on a rod 212 on the frame, the other arm of this lever being connected to a link 214 which extends rearwardly and has in its rear end a slot 216 into which projects a pin 218 from the lower end of the previously mentioned wiper-operating lever 176. It will thus be seen that as the lever 176 is swung in a clockwise direction (Fig. 3) to operate the toe wipers, the pin 218 is carried along the slot 216 and near the end of the operative movements of the wipers acts through the link 214 and its connections with the lever 202 to swing the shoe rest 30 a short distance forwardly and thus to provide more space between the bottom of the last and the wipers for the operation of the binder-applying means, the spring 46 which controls the shoe holder 34 yielding as required in this operation. Notwithstanding such relative separating movement of the wipers and the last the wipers maintain an effective hold on the upper because of the fact that its free margin is at this time gathered within a comparatively small area and by reason of the tendency of the margin of the resilient felt material to spread outwardly over the rear faces of the wipers.

The means for applying a binder about the gathered margin of the upper is carried by a plate 220 (Figs. 3 and 4) mounted for vertical movements in guideways provided in members 222 and 224 which are secured on the front face of the plate 138. Secured to the front of the plate or carrier 220 is a forwardly projecting bracket 226 on which are supported a pair of binder-applying members 228 and 230, shown in Fig. 10 as viewed from the rear, these members comprising plates having in their lower edges grooves which are initially in alinement with each other to receive a binder wire w, as illustrated in Fig. 10. The binder wire is fed into these grooves by means hereinafter described. Secured to the plate 220 between it and the bracket 226 is a member 232 (Fig. 11) provided with a finger 234 which extends downwardly between the binder-applying members 228 and 230 and has fast thereon a leaf spring 236 between the lower end of which and the finger 234 the binder wire is fed, this spring serving to hold the binder in place in the grooves in the members 228 and 230 after it has been severed from the rest of the wire by means hereinafter described. Also secured to the finger 234 is a resilient plate 238 (Figs. 4 and 11) having in its lower edge a recess similar to the recess 132 in the wiper plate 130, this resilient plate being arranged to serve as an auxiliary wiper to wipe the upper close to the bottom of the last in the downward movement of the plate 220, after the forward movement of the forepart of the shoe, and to hold the upper pressed upon the bottom of the last in the binder-applying operation, as illustrated in Fig. 17.

The binder wire is fed into the grooves in the members 228 and 230 from a guide block 240 (Figs. 2 and 10) carried by the plate 220 and provided with a guideway arranged to aline with these grooves when the parts are in their starting positions. A flexible and extensible wire guide 242 extends from the block 240 to a bracket 244 (Figs. 1 and 2) secured to an arm 246 fast on the plate 138, this bracket being provided with an arm 248 on which is rotatably mounted a reel 250 supporting a coil of binder wire. From the reel the wire is fed into the flexible guide 242 by two feed wheels 252 and 254 on the bracket 244, the wheel 254 being pressed against the wheel 252 by a spring 256. The two feed wheels are geared together, as indicated at 257 (Fig. 1). For turning the feed wheels there is mounted on the same shaft 258 as the wheel 252 a pinion 259 engaged by a gear sector 260 which is pivotally mounted at 262 on the arm 246, this gear sector being provided with an arm 264 normally held by a spring 266 in contact with a stop screw 268 on the frame of the machine. The gear sector 260 is operated to feed the wire to the binder-applying means at that time in the cycle of the machine when the gripper is operated to pull the upper. For this purpose the previously mentioned bell-crank lever 110 has an upwardly inclined arm 270 which has adjustably secured on its upper end a plate 272 arranged to engage a rod 274 (Figs. 1 and 2) projecting rearwardly from the arm 264 of the gear sector 260 and thus to impart to this arm downward swinging movement to feed the wire as the gripper is operated. The pinion 259 is intermittently connected to the shaft 258 through a clutch 276 (Fig. 1) which may be of any suitable well-known type, so that the feed wheels are driven by the downward movement of the arm 264 but remain stationary when the arm is returned by the spring 266.

Figure 2:
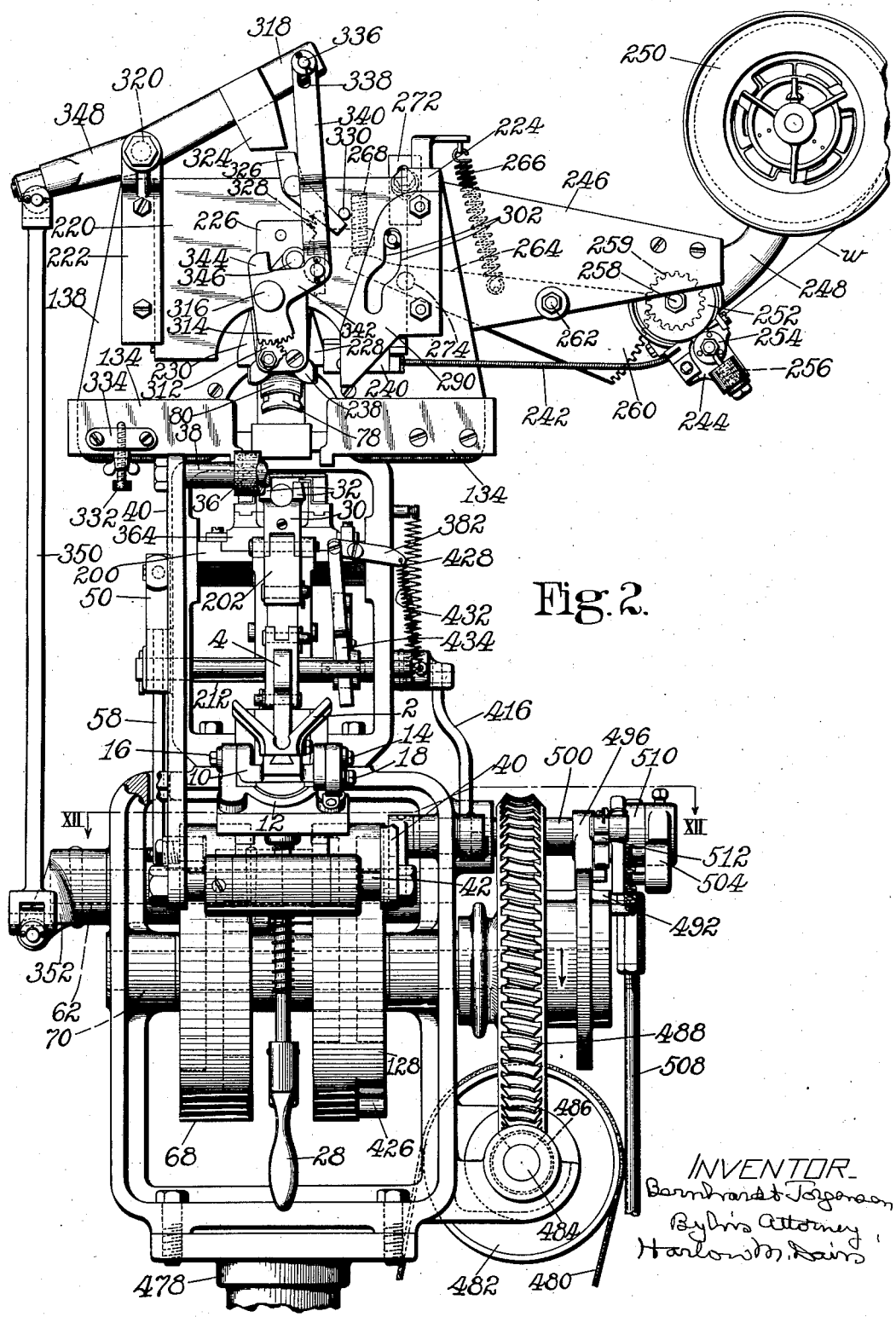
Fig. 2 shows the upper portion of the machine in front elevation, with parts broken away.

The binder b is severed from the rest of the wire substantially at the beginning of the downward movement of the plate 220 by a cutter comprising a knife 278 (Figs. 6 and 10) fastened to a slide 280 which is horizontally movable in a recess in the guide block 240 between the ends of the block. A spring 282 holds this slide initially in a starting position determined by engagement of a part of the knife 278 with a plate 284 fast on the lower face of the block 240, as illustrated in Fig. 6 At its forward end the slide 280 carries a roll 286 which early in the downward movement of the plate 220 is engaged by a cam 288 formed on a plate 290 fast on the member 224 (Fig. 2). The knife 278 is thus moved rearwardly by the cam to cut the wire, after which it is retracted by the spring 282 as the roll 286 is carried farther downwardly by the plate 220.

It will be evident that since the wire is cut at a point between the ends of the guide block 240, a portion of the binder remains in the guideway in the block after the binder has been severed by the knife 278 from the rest of the wire. In order to clear this portion of the binder, and also to provide room for the operation of the binder-applying member 228 in the path of which the block 240 is positioned at the time when the wire is fed, the block 240 is moved lengthwise of the binder away from the member 228 in response to further downward movement of the plate 220 after the binder is severed. For this purpose the block 240 is mounted to slide horizontally along a guideway in the plate 220, in which guideway a portion of the block is held by a gib 292 (Figs. 6 and 7) fast on the plate, and a pin 294 projecting from the block is engaged by the forked lower end of a lever 296 pivoted at 298 (Fig. 4) on the plate 220. At its upper end this lever carries a roll 300 which lies in a cam slot 302 formed in the plate 290, and by the action of this cam slot on the roll the lever is operated to retract the block 240 to the position illustrated in Fig. 4. It will be understood that the severing of the binder takes place when the roll 300 is in the upper vertical portion of the cam slot and that the retractive movement of the block 240 is thereafter effected by the intermediate inclined portion of the cam slot.

The binder-applying members 228 and 230 are fastened respectively to arms 304 and 306 (Figs. 1, 3, 4 and 10) which extend forwardly and then downwardly and are pivotally mounted on the bracket 226 for swinging movements about horizontal forwardly and rearwardly extending axes. By such swinging movements of the arms the members 228 and 230 are carried from the positions illustrated in Fig. 10 to the positions illustrated in Fig. 4 to bend the binder partially around the gathered margin of the upper, the members being guided in part by a groove 308 (Fig. 10) formed in the rear face of the plate 220 and into which portions of the members extend. The two arms 304 and 306 are connected together to swing in unison by intermeshing gear teeth 310 (Figs. 5 and 10) formed thereon. Connected to the arm 306 to turn therewith is a gear sector 312 which is engaged and operated by another gear sector 314 pivotally mounted on a stud 316 on the bracket 226.

Figure 4:
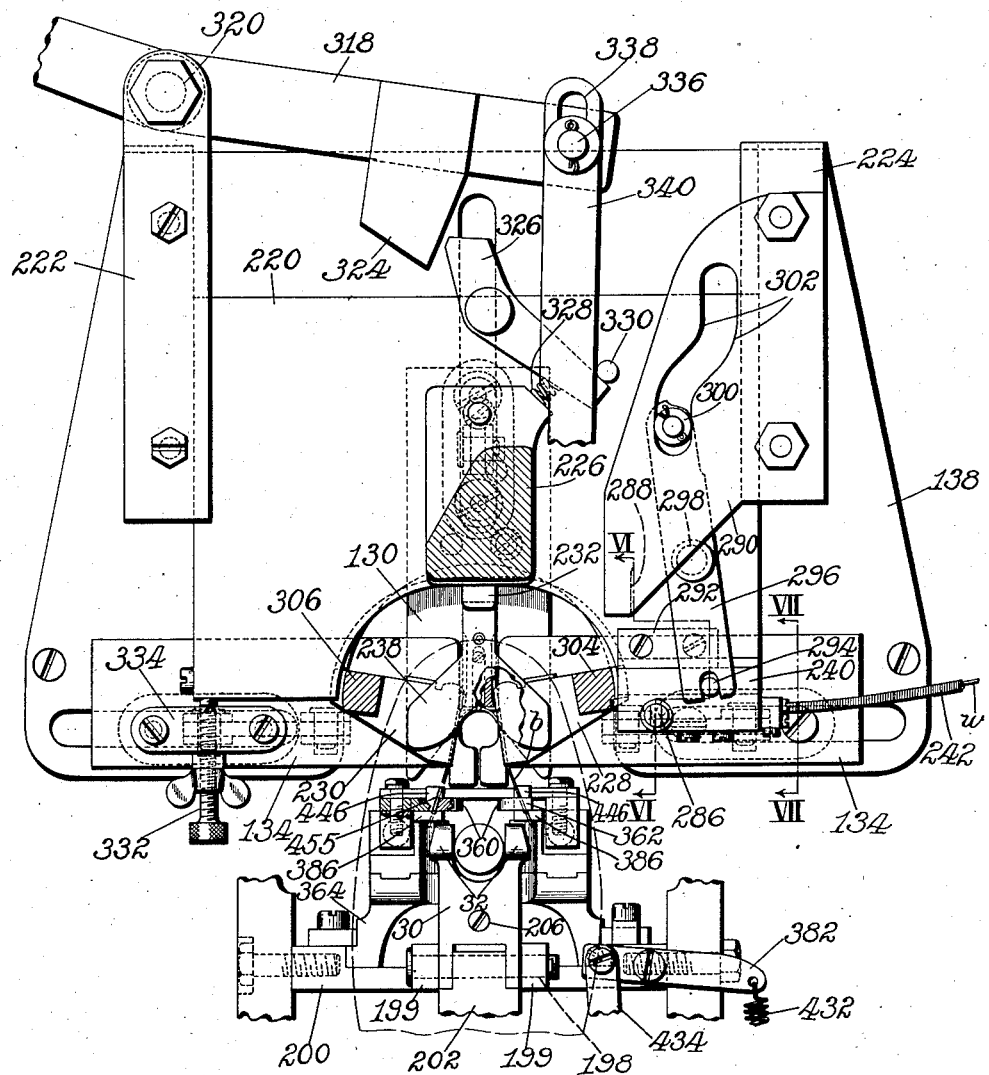
Fig. 4 is a view of a portion of the structure in front elevation, on a larger scale than Fig. 2, with parts broken away.

Downward movement is imparted to the plate 220, and operative swinging movement also is imparted to the gear sector 314, by a lever arm 318 (Figs. 1, 2 and 4) fast on a rock shaft 320 which is mounted in a bearing in the member 222 and in bearing 322 (Fig. 1) on the frame of the machine. This lever arm has thereon a lug 324 arranged to engage the upper end face of a pawl 326 which is pivotally mounted on the plate 220 and is held normally by a spring 328 in a position determined by a pin 330 on the plate. The plate 220 is accordingly moved downward along its guideways by engagement of the lug 324 with the pawl 326, as well as in part by gravity, the downward movement of the plate being adjustably limited, as shown in Fig. 4, by its engagement with the upper end of a screw 332 threaded in a plate 334 which is fast on the front of one of the side wipers 134 (Figs. 8 and 9). Near the end of the downward movement of the plate 220 the lug 324 slips off the upper end of the pawl 326 by reason of the swinging of the arm 318, and thereafter further downward movement of this arm is utilized to operate the gear sector 314 and thus to bend the binder about the margin of the upper (Fig. 4) while the plate 220 is at the limit of its downward movement. For this purpose the arm 318 carries a pin 336 extending into a slot 338 in the upper end of a link 340 which is connected at its lower end to an arm 342 on the gear sector 314. The movement of the gear sector in the direction to bend the binder about the upper is limited by engagement of another arm 344 thereon with a pin 346 on the bracket 226 (Fig. 5). By engagement with the arm 342 the pin 346 also determines the initial position of the gear sector (Fig. 2), the binder-applying members 228 and 230 being then positioned as shown in Fig. 10. It will be understood that the slot 338 provides for lost motion so that the link 340 will not be operated by downward movement of the arm 318 until after the lug 324 on the arm slips off the pawl 326. When the arm 318 is swung upwardly in the return of the parts to starting positions it first returns the gear sector 314 and then acts through the link 340 to lift the plate 220 by reason of engagement of the arm 342 of the gear sector with the pin 346. In such upward movement of the arm 318 its lug 324 slips past the upper end of the pawl 326, the pawl being swung against the resistance of its spring 328 to permit this.

For operating the arm 318 as above described there is also fast on the rock shaft 320 another arm 348 connected by a universal joint to the upper end of a link 350 which is similarly connected at its lower end to an arm 352 (Figs. 2 and 12) fast on the rock shaft 62. Also fast on this rock shaft is an arm 354 provided with a roll 356 engaged by a path cam 358 formed in one side of the cam wheel 68.

Figure 3:
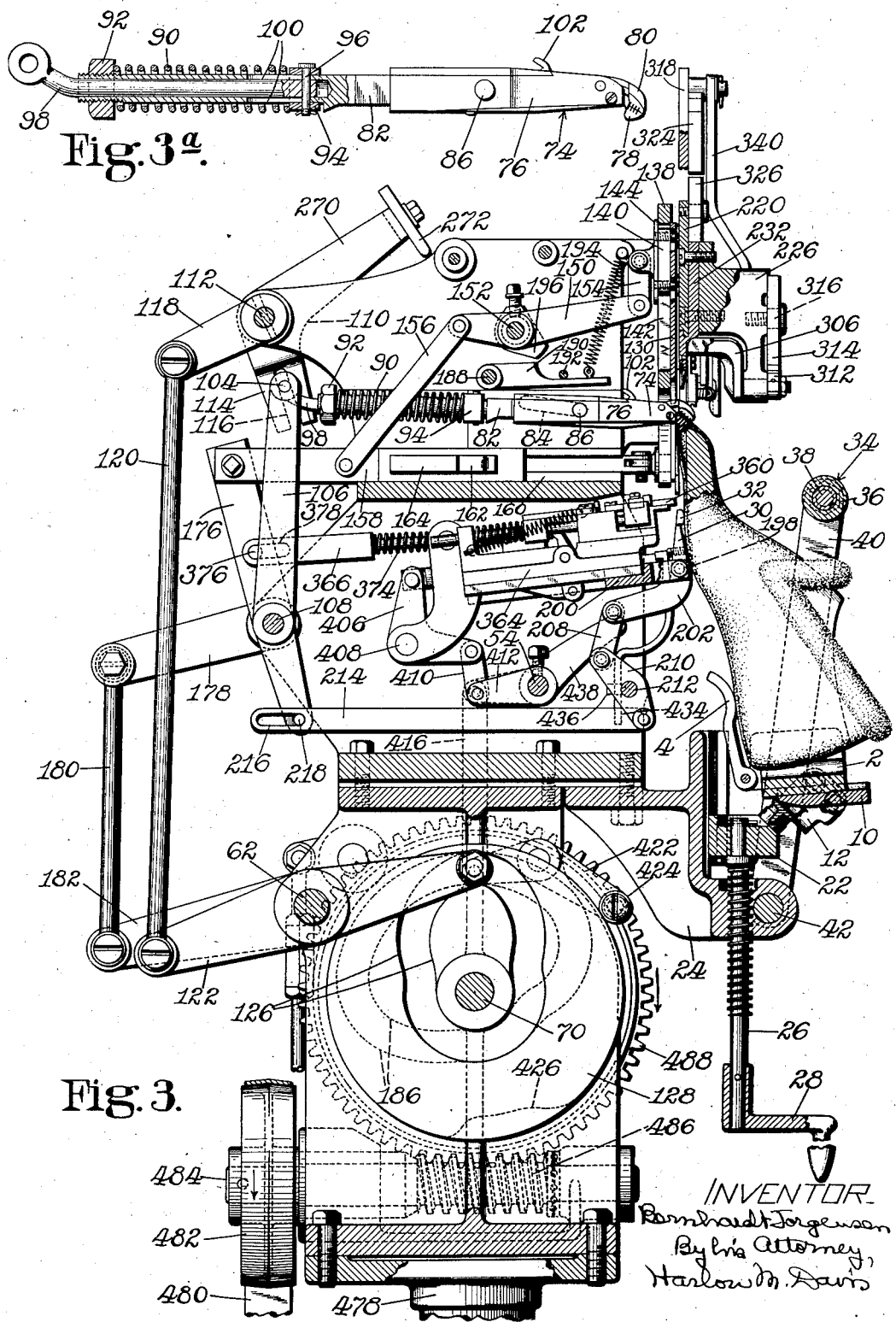
Fig. 3 is a view of the upper portion of the machine partly in left-hand side elevation and partly in section.

After the binder *b* has been bent partially around the margin of the upper by the members 228 and 230, as illustrated in Figs. 4 and 17, its opposite end portions are bent to provide projections directed toward the bottom face of the last and adapted to be forced through the felt upper material and against the last. For this purpose there are provided a pair of fingers 360 (Fig. 13) arranged to extend heightwise of the shoe at the rear of the shoe bottom and having front ends 362 arranged to extend outward laterally of the shoe so as to lie between the end portions of the binder and the bottom of the shoe at the end of the bending movements of the members 228 and 230. Through means hereinafter described these fingers are supported indirectly on a slide 364 (Figs. 3 and 14) mounted for forward and rearward movements along guideways on the previously mentioned plate 200. Initially, as shown in Fig. 3, this slide is so positioned that the fingers 360 are out of contact with the bottom of the shoe, and the slide is moved forwardly to carry them into contact with the shoe, as illustrated in Fig. 16, before the members 228 and 230 receive their bending movements. For this purpose there is provided a link 366 (Figs. 3 and 13) having a cylindrical portion slidingly mounted in a pin 368 which is swiveled in lugs on the slide 364. At the front of this pin is a washer 370 confined on the end of the link, and at the rear of the pin is another washer 372 which serves as an abutment for a spring 374, the spring abutting at its rear end against a shoulder on the link 366. The link is operated by the same lever 176 which operates the toe wipers, and for this purpose the lever carries a pin 376 projecting into a slot 378 in the link. This slot affords provision for lost motion, so that the link 366 is not operated until after the wipers have received a portion of their operative movements. When thus operated, the link acts through the spring 374 to move the slide 364 forwardly and thus to force the fingers 360 yieldingly against the bottom of the shoe. Near the end of the operative movements of the wipers, as hereinbefore described, the shoe bottom rest 30 is operated by the lever 176 to swing the forepart of the shoe forwardly so as to provide room for the binder-applying means, and as the shoe is thus moved the fingers 360 are maintained in contact therewith by further movement of the slide 364. The head of a screw 380 mounted in the slide 364 is thus carried (Fig. 17) substantially into contact with a lever 382 mounted on the front end of the plate 200 (Fig. 2) for a purpose hereinafter explained, the spring 374 being compressed in the course of these operations by the movement of the link 366. The front ends of the fingers 360 having been positioned against the bottom of the shoe as described the end portions of the binder are carried into engagement with the fingers at the rear of their lateral projections 362 as the binder is bent by the members 228 and 230. To assist in retaining the end portions of the binder in place on the fingers when the latter receive their operative movements, there are provided in the projections 362 shallow notches 384 (Fig. 13) which receive the ends of the binder. By reference to Fig. 4 it will be seen that by contact with the fingers 360 the portions of the binder which extend downwardly below the members 228 and 230 are flared somewhat outwardly away from each other relatively to these members, which affords increased insurance that the binder will remain in the grooves in these members in later operations.

The bending of the opposite end portions of the binder, as illustrated in Fig. 18, to provide projections adapted to be forced into the upper material is effected by movement of the fingers 360 rearwardly away from the shoe bottom relatively to other fingers 386 positioned immediately below them. The fingers 386 are integral with blocks 388 (Figs. 13 and 14) secured to the slide 364 and are provided with grooves 390 which receive the bent ends of the binder as the fingers 360 are moved rearwardly. For the purpose of such rearward movement the fingers 360 are mounted in a manner hereinafter described on a slide 392 movable along a guideway on the main slide 364 and operated by a plunger 394. This plunger extends through the slide 392 and is provided at its front end with an enlarged head 396 between which and the front end of the slide is a compression spring 398 (Fig. 15). At its rear end the plunger 394 is fastened by a pin 400 to a block 402 which is fastened by the same pin to another plunger 404 movable lengthwise in a bearing in the slide 364. The plunger 404 at its rear end is connected to one arm of a bell-crank lever 406 fulcrumed on a pin 408 on the slide 364, and the other arm of this bell-crank lever is connected by a link 410 to an arm 412 (Fig. 3) fast on the previously mentioned shaft 54 which is a rock shaft. Also fast on the shaft 54 is an arm 414 (Fig. 1) connected by a link 416 to an arm 418 (Fig. 12) fast on a rock shaft 420 mounted in the frame of the machine. Also fast on the shaft 420 is an arm 422 which carries a roll 424 arranged to engage the periphery of the cam wheel 128. In the periphery of this cam wheel is a depression 426 (Figs. 2 and 3), and when this depression arrives in a position under the roll 424 a spring 428 (Figs. 1 and 2) connected to the arm 414 is permitted to lift the arm and thus to swing the bell-crank lever 406 (Fig. 15) in a counterclockwise direction. This serves to move the slide 392 rearwardly until its movement is stopped by engagement with a shoulder 430 on the slide 364, the slide 392 being operated by the bell-crank lever 406 through the connected plungers 394 and 404. In this manner the ends of the binder are bent as illustrated in Fig. 18, the bent ends entering the grooves 390 in the fingers 386. It will be observed that as an incident to this operation portions of the binder near the bent ends, extending downwardly beyond the members 228 and 230, are bent outwardly from the shoe bottom by the fingers 360.

When the fingers 360 are moved rearwardly out of contact with the shoe to bend the ends of the binder as above described, the slide 364 is held against forward movement toward the shoe under the influence of the previously compressed spring 374 by engagement of the screw 380 in its front end with the lever 382. Substantially at the end of the operative rearward movement of the fingers 360, however, this lever is swung, against the resistance of a spring 432 (Figs. 1 and 2) which controls it, to release the screw 380, whereupon the slide 364 is moved forwardly by the spring 374 to carry the fingers 386 into engagement with the bottom of the shoe, as illustrated in Fig. 19, so that these fingers will serve as effective guides for the bent ends of the binder when these ends are thereafter forced through the felt upper. Such swinging movement of the lever 382 is effected through a link 434 pivotally connected at its upper end to the lever and guided at its lower end by a clip 436 on the rod 212, the lower portion of the link being offset rearwardly as illustrated in Fig. 3. This offset portion of the link is engaged by an arm 438 fast on the rock-shaft 54 to depress the link as described.

In order to permit the bent ends of the binder to be forced through the upper it is necessary to withdraw the projections 362 on the fingers 360 from between the binder and the shoe. For this purpose the fingers are pivotally mounted on studs 440 (Figs. 13 and 15) on the slide 392 and their rear end portions, which are positioned in a lower plane than the portions projecting forwardly from the studs, are engaged by a pin 442 mounted in the plunger 394. This pin serves to determine the initial positions of the fingers, as illustrated in Fig. 13, the rear portions of the fingers being held against the pin by a spring 444 which tends to swing their forwardly extending portions apart. By continued movement of the plunger 394 after the rearward movement of the slide 392 has been stopped by the shoulder 430 the pin 442 is moved relatively to the fingers 360 and acts on inwardly inclined faces on the rear ends of the fingers to spread these ends apart and thus to swing the forwardly extending portions of the fingers inwardly toward each other, as illustrated in Fig. 20. The projections 362 on the fingers are thus withdrawn from between the binder and the shoe.

As a result of still further movement of the plunger 394 in the same direction, i. e. rearwardly away from the shoe, the bent ends of the binder are driven through the felt upper by means provided for that purpose. This means comprises a pair of drivers 446 secured to blocks 448 which are fast on the front ends of plungers 450 slidingly mounted in the blocks 388 and also in lugs 452 on the rear end of the slide 364. A cross-bar 454 is secured to the blocks 448 over portions of the drivers 446 and extends over the fingers 360 to assist in guiding these fingers. The front ends of the drivers 446 are thus positioned directly upon the upper faces of the guiding fingers 386, these ends having grooves 455 (Figs. 4 and 13) therein which receive and control the binder. Secured to the two plungers 450, with its intermediate portion over the plunger 394, is another cross-bar 456, and between this cross-bar and the lugs 452 on the slide 364 are compression springs 458 which tend to force the plungers 450 forwardly toward the shoe. The plungers are, however, held retracted until the proper time for the operation of the drivers 446 by means of a latch 460 in engagement with a lug 462 on the cross-bar 456, as illustrated in Fig. 13. The latch 460 is pivotally mounted on a stud 463 on one of the blocks 388 and is held yieldingly in operative position by a spring 464. To release the crossbar 456 and thus permit the drivers 446 to be operated by the springs 458, a lug 466 on the latch 460 is engaged by a reduced upwardly extending portion 468 of the pin 442, as illustrated in Fig. 20, immediately after the fingers 360 have been swung away from the binder by the action of the pin thereon. In this manner the latch is swung by continued movement of the plunger 394 to release the crossbar 456 while the pin 442 is still in position to hold the rear end portions of the fingers 360 apart.

When the crossbar 456 is thus released, the two drivers 446 are impelled forwardly by the springs 458 to drive the bent ends of the binder through the felt upper, as illustrated in Fig. 21, the ends of the binder after they penetrate through the upper being deflected toward the end of the toe by contact with the bottom face of the last, so that they are clinched by the last toward the end of the toe on the inner face of the upper and thus insure that the binder will be securely held in operative position.

The clinching of the ends in that direction results, in part, from the fact that the bent ends of the binder are inclined somewhat toward the end of the toe (Figs. 18 and 19) due to a corresponding inclination of the guide fingers 386, and in part also from the fact that the bent ends extend at acute angles to the portions of the binder which are bent outwardly from the shoe bottom by the fingers 360 in forming the bent ends, so that as these portions are forced back into parallel relation to the shoe bottom by the drivers the tendency is to tip the bent ends still farther toward the end of the toe. It will be understood, of course, that the wire of which the binder is made is comparatively fine soft wire, so that the ends of the binder are readily deflected by the hard wood of the last without penetrating the last.

After the binder-applying and fastening operations the slide 364 is returned to its starting position by the action of the lever 176 on the link 366, and the plungers 394 and 404 are moved relatively to the slide to return them to their initial positions by the bell-crank lever 406. The return movement of the driver-operating crossbar 456 against the resistance of the springs 458 is effected through a lever 470 (Figs. 13, 14 and 15) fulcrumed on a pin 472 on the slide 364 and having upwardly extending portions 474 (Fig. 13) arranged to engage portions of the cross-bar 456. At its lower end the lever 470 carries a pin 476 arranged to be engaged by a portion of the block 402 to swing the lever and thus to return the crossbar 456 into position to be held by the latch 460 when the block 402 is moved toward the right (Fig. 15) with the plunger 404 in the return of the parts to starting positions. It will be understood that the movement of the plunger 404 toward the left in the binder-applying operation, as hereinbefore described, serves to carry the block 402 away from the pin 476 and thus to leave the lever 470 free to permit the driver-operating movement of the crossbar 456.

The parts hereinbefore described are supported on a column 478 the upper end portion only of which is shown in the drawings, and at the base of the column is a power-driven pulley (also not shown) which through a belt 480 drives a pulley 482 fast on a shaft 484 mounted in bearings in the frame of the machine. The shaft 484 has formed thereon a worm 486 which engages and drives a worm gear 488 mounted to turn on the cam shaft 70. The worm gear 488 may be connected to the shaft 70 to operate the machine through any suitable clutch. For this purpose there are provided, in the construction shown, a plurality of holes 490 (Fig. 1) formed in the worm gear, and slidingly mounted in a member 492 fast on the shaft 70 is a spring-pressed pin 494 arranged to enter any one of these holes when permitted by a wedge arm 496. This arm, by engagement with a projection 498 on the pin 494, serves normally to hold the pin in retracted position so as to permit the worm gear 488 to turn idly on the shaft 70. The wedge arm 496 is mounted to swing about a rod 500 and is normally held by a spring 502 in position to prevent the pin 494 from entering any one of the holes 490, this spring being connected at one end to an arm 504 fast on the rod 500. The wedge arm 496 is swung into position to release the pin 494 by means of a treadle 506 mounted at the base of the machine and connected by a link 508 to a lever 510 mounted to swing on the rod 500, this lever carrying a spring-pressed pawl 512 one end of which is arranged to abut against a shoulder on the wedge arm 496 as illustrated in Fig. 1. Accordingly when the treadle 506 is depressed the lever 510 acts through the pawl 512 to swing the wedge arm 496 into position to release the pin 494 and thus to start the machine. To insure that the machine will stop at the end of one revolution of the cam shaft 70, the member 492 on the shaft is arranged to engage the pawl 512 and swing it out of abutting relation to the shoulder on the arm 496, thus permitting the spring 502 to swing this arm back into position to withdraw the pin 494 from the hole 490 in the worm gear 488 at the end of one revolution of the cam shaft. When the operator releases the treadle 506 the treadle and the lever 510 are returned to their starting positions by a spring 514 connected to a lug on the lever, whereupon the pawl 512 snaps back into position to act on the arm 496 when the treadle is again depressed.

In the operation of the machine, briefly summarized, the shoe is presented by the operator in the position illustrated in Fig. 3, with the free margin of the toe end of the upper between the jaws of the toe gripper. The starting treadle is then depressed, whereupon the gripper is operated to pull the upper. Near the end of the upper-pulling movement of the gripper the shoe holder 34 is swung into engagement with the top of the forepart of the shoe, and at substantially the same time the toe wipers 130 and 134 begin their inward movements. Fig. 16 illustrates the positions of the parts as the wipers begin to wipe the upper inwardly over the bottom of the last, the slide 364 having been moved forwardly by the wiper-operating lever 176 (Fig. 3) far enough to bring the fingers 360 into engagement with the bottom of the shoe. As the wipers continue their inward movements the tripping member 102 on the gripper is operated by the plate 190 to cause the gripper to release the upper, and before they complete their inward movements the shoe rest 30 is operated to swing the forepart of the shoe forwardly and thus to provide more room between the wipers and the bottom of the shoe for the operation of the binder-applying means, the fingers 360 being maintained yieldingly in contact with the bottom of the shoe by further forward movement of the slide 364. Prior to the completion of the movements of the wipers the plate 220 (Fig. 2) which carries the binder-applying members 228 and 230 starts downward, binder wire having been previously fed into the grooves in these members at the time of the pulling of the upper by the gripper. By the downward movement of the plate 220 the wire is cut and the wire guide 240 is then retracted. When the plate arrives at the end of its downward movement the intermediate portion of the binder lies adjacent to the gathered margin of the upper held by the toe wipers, the upper between the gathered margin and the edge of the last bottom being pressed close against the last bottom by the flexible auxiliary wiper plate 238 carried by the plate 220. The binder-applying members 228 and 230 next receive their swinging movements to bend the binder partially around the gathered margin of the upper and to carry its ends over the lateral projections 362 on the fingers 360. The parts are then in the positions illustrated in Fig. 17.

As the operation of the machine continues the fingers 360 are moved rearward relatively to the fingers 386 below them to bend the ends of the binder so that they point toward the bottom of the last with an inclination toward the end of the toe, the bent ends being carried into the grooves 390 (Fig. 13) in the fingers 386. This operation is illustrated in Fig. 18, by reference to which it will be observed that portions of the binder extending downwardly below the members 228 and 230 are inclined outwardly away from the shoe bottom by the action of the fingers 360 so that the bent ends of the binder extend at acute angles to these outwardly inclined portions. The slide 364 is next released by the lever 382, whereupon it is moved forward by the spring 374 to carry the fingers 386 into contact with the shoe bottom (Fig. 19). By frictional contact of these fingers with the bent ends of the binder the portions of the binder extending below the members 228 and 230 are bent somewhat toward the shoe bottom in this operation, which serves to tip or incline the bent ends of the binder farther toward the end of the toe. The fingers 360 are then operated to withdraw their projections 362 from between the binder and the shoe (Fig. 20), after which the driver-operating cross-bar 456 (Fig. 13) is released by the latch 460 to cause the drivers 446 to drive the bent ends of the binder through the felt upper and against the bottom face of the last (Fig. 21), the outwardly inclined portions of the binder below the members 228 and 230 being bent into parallel relation to the shoe bottom in this operation. By reason of the previous inclination of the ends of the binder toward the end of the toe, and the fact that the bending of the portions of the binder below the members 228 and 230 into parallel relation to the shoe bottom by the action of the drivers tends to incline the ends still farther in that direction, the ends of the binder are clinched forwardly toward the end of the toe by the contact of the last therewith. Thereafter the parts of the machine are returned to their starting positions and the shoe is released.

The condition of the toe end of the shoe after it has been operated upon by the machine is illustrated in Fig. 22. It will be observed that the margin of the toe end of the upper, gathered within a comparatively small area over the bottom of the last substantially midway between the opposite sides of the toe, is held effectively by the wire binder with the upper between the gathered margin and the edge of the last bottom in a smooth condition. The binder is held securely in place by its clinched ends without penetration of the last by any fastenings. After the felt upper has dried, the binder is removed to permit the upstanding margin of the upper to be trimmed off. In removing the binder its intermediate portion is pulled upwardly from the shoe bottom, which results in bending the clinched ends of the soft wire reversely far enough to permit the ends to be readily withdrawn from the upper without tearing it.

Having described the invention, what I claim as new and desire to secure by Letters Patent of the United States is:

1. That improvement in methods of lasting shoes which consists in working an end of a shoe upper into lasted position with its margin upstanding over the bottom of a last, applying a binder over the bottom of the last in position to hold the upstanding margin of the upper, and anchoring the binder by forcing its end portions into the shoe toward the bottom face of the last and clinching them on the last.

2. That improvement in methods of lasting shoes which consists in working an end of a shoe upper into lasted position with its margin upstanding over the bottom of a last, applying a wire binder over the bottom of the last in position to hold the upstanding margin of the upper, and forcing the ends of the binder into the shoe and against the bottom face of the last with the ends inclined to said face to cause them to be clinched by the last.

3. That improvement in methods of lasting shoes which consists in working the toe end of a shoe upper into lasted position with its margin upstanding over the bottom of a last, applying a wire binder over the bottom of the last in position to hold the upstanding margin of the upper, bending the ends of the binder to point toward the bottom face of the last in directions inclined toward the end of the toe, and driving the bent ends of the binder into the shoe and against the bottom face of the last to clinch them on the last toward the end of the toe.

4. That improvement in methods of lasting the toes of felt shoes which consists in working the toe end of a felt upper over and in contact with the bottom face of a last and gathering its margin in upstanding relation to the bottom of the last, applying a binder in position to hold the gathered margin of the upper, and fastening the binder by anchoring its ends to the felt upper only.

5. That improvement in methods of lasting the toes of felt shoes which consists in working the toe end of a felt upper over and in contact with the bottom face of a last and gathering its margin in upstanding relation to the bottom of the last, applying a wire binder in position to hold the gathered margin of the upper, and fastening the binder by forcing its ends through the felt upper and clinching them on the bottom face of the last in directions toward the end of the toe.

6. In a lasting machine, means for gathering the margin of an end portion of an upper over the bottom of a last, means for applying a binder in position to hold the gathered margin of the upper, and additional means movable to force the ends of the binder into the shoe toward the bottom face of the last to fasten the binder in upper-holding position.

7. In a lasting machine, means for gathering the margin of an end portion of an upper over the bottom of a last, means for applying a binder in position to hold the gathered margin of the upper, means constructed and arranged to bend the ends of the binder after the binder has been thus applied, and mechanism movable to force the bent ends of the binder into the shoe to fasten the binder in upper-holding position.

8. In a lasting machine, means for gathering the margin of an end portion of an upper over the bottom of a last, means for applying a binder in position to hold the gathered margin of the upper, and driving means movable after the binder has been thus applied to force the ends of the binder through the upper and against the bottom face of the last to clinch said ends on the last.

9. In a lasting machine, means for gathering the margin of an end portion of an upper over the bottom of a last, means for applying a binder in position to hold the gathered margin of the upper, mechanism movable to bend the ends of the binder in such directions as to extend heightwise of the shoe, and driving means movable heightwise of the shoe to force the bent ends of the binder into the shoe toward the bottom face of the last.

10. In a lasting machine, means for gathering the margin of an end portion of an upper over the bottom of a last, means for applying a binder in position to hold the gathered margin of the upper, mechanism movable to bend the ends of the binder after the binder has been thus applied, and driving means movable thereafter to force the bent ends of the binder into the shoe and against the bottom face of the last to clinch said ends on the last.

11. In a lasting machine, means for gathering the margin of the toe-end portion of an upper over the bottom of a last, means for applying a wire binder in position to hold the gathered margin of the upper, and mechanism movable thereafter to force the ends of the binder into the shoe and against the bottom face of the last to clinch them on the last in directions toward the end of the toe.

12. In a lasting machine, means for gathering the margin of the toe-end portion of an upper over the bottom of a last, means for applying a wire binder in position to hold the gathered margin of the upper, mechanism constructed and arranged to bend the ends of the binder in such relation to other portions thereof as to point toward the bottom face of the last in directions inclined toward the end of the toe, and means movable to force the bent ends of the binder into the shoe and against said face to clinch them in directions toward the end of the toe.

13. In a lasting machine, means for gathering the margin of the toe-end portion of an upper over the bottom of a last, members movable to bend a binder partially around the gathered margin of the upper with the end portions of the binder projecting beyond them lengthwise of the shoe, and mechanism movable to force said projecting end portions of the binder into the shoe toward the bottom face of the last while the binder is controlled by said members.

14. In a lasting machine, means for gathering the margin of the toe-end portion of an upper over the bottom of a last, members movable to bend a binder partially around the gathered margin of the upper with the end portions of the binder projecting beyond them lengthwise of the shoe, a device constructed and arranged to bend the ends of the binder heightwise of the shoe to point toward the bottom face of the last while the binder is controlled by said members, and driving means movable thereafter to force the bent ends of the binder heightwise of the shoe into the shoe bottom.

15. In a lasting machine, means for gathering the margin of the toe-end portion of an upper over the bottom of a last, members movable to bend a wire binder partially around the gathered margin of the upper, said members having grooves therein, means for feeding binder wire into said grooves prior to the bending movements of the members, means for cutting the wire to provide a portion to serve as a binder, and mechanism constructed and arranged to bend the ends of the binder heightwise of the shoe and to force said ends into the shoe bottom after the binder has been applied and while it is controlled by said members.

16. In a lasting machine, means for gathering the margin of the toe-end portion of an upper over the bottom of a last, means for applying a binder in position to hold the gathered margin of the upper, means for bending the end portions of the binder heightwise of the shoe away from the shoe bottom after the binder has been thus applied and for simultaneously bending the ends of the binder in such directions as to point toward the shoe bottom, and driving means movable heightwise of the shoe to force the bent ends of the binder into the shoe bottom.

17. In a lasting machine, means for gathering the margin of the toe-end portion of an upper over the bottom of a last, means for applying a binder in position to hold the gathered margin of the upper, members arranged to engage the end portions of the binder and movable heightwise of the shoe to bend said end portions away from the shoe bottom after the binder has been thus applied, means for bending the ends of the binder toward the shoe bottom in response to the movement of said members, and driving means movable thereafter to force the bent ends of the binder into the shoe toward the bottom face of the last to fasten the binder in upper-holding position.

18. In a lasting machine, means for gathering the margin of the toe-end portion of an upper over the bottom of a last, means for applying a binder in position to hold the gathered margin of the upper, members arranged to engage the end portions of the binder and movable heightwise of the shoe to bend said end portions away from the shoe bottom after the binder has been thus applied, other members constructed and arranged to bend the ends of the binder toward the shoe bottom in response to the movement of said first-named members and to serve thereafter as guides for the bent ends of the binder, and drivers movable along said other members to force the bent ends of the binder into the shoe bottom.

19. In a lasting machine, means for gathering the margin of the toe-end portion of an upper over the bottom of a last, means for applying a binder in position to hold the gathered margin of the upper, members movable heightwise of the shoe to bend the end portions of the binder away from the shoe bottom after the binder has been thus applied, other members arranged to bend the ends of the binder toward the shoe bottom in response to the movement of said first-named members and having grooves therein to receive the ends of the binder, means for moving said other members heightwise of the shoe into engagement with the shoe bottom after the ends of the binder have thus been bent, and driving means movable along said other members to force the bent ends of the binder into the shoe bottom.

20. In a lasting machine, means for gathering the margin of the toe-end portion of an upper over the bottom of a last, means for applying a binder in position to hold the gathered margin of the upper, members movable heightwise of the shoe to bend the end portions of the binder away from the shoe bottom after the binder has been thus applied, other members arranged to bend the ends of the binder to point toward the shoe bottom in directions inclined toward the end of the toe in response to the movement of said first-named members, said other members having guiding faces for the bent ends of the binder likewise inclined toward the end of the toe, and drivers movable along said guiding faces to drive the ends of the binder into the shoe bottom and to clinch them on the last toward the end of the toe.

21. In a lasting machine, means for gathering the margin of the toe-end portion of an upper over the bottom of a last, means for bending a binder partially around the gathered margin of the upper, members having portions arranged to extend laterally of the shoe between the shoe bottom and the end portions of the binder after such bending of the binder, means for moving said members first heightwise of the shoe into engagement with the shoe bottom to receive the end portions of the binder and for thereafter moving them reversely to bend said end portions away from the shoe bottom, means for bending the ends of the binder toward the shoe bottom in response to the movement of said members, and driving means movable heightwise of the shoe to force the bent ends of the binder into the shoe bottom.

22. In a lasting machine, means for gathering the margin of the toe-end portion of an upper over the bottom of a last, means for applying a binder in position to hold the gathered margin of the upper, members movable heightwise of the shoe to bend the end portions of the binder away from the shoe bottom after the binder has been thus applied, means for bending the ends of the binder toward the shoe bottom in response to the movement of said members, drivers movable heightwise of the shoe to force the bent ends of the binder into the shoe bottom, and means for withdrawing said members from the binder prior to the operation of said drivers.

23. In a lasting machine, means for gathering the margin of the toe-end portion of an upper over the bottom of a last, means for applying a binder in position to hold the gathered margin of the upper, fingers movable bodily heightwise of the shoe to bend the end portions of the binder away from the shoe bottom after the binder has been thus applied and mounted also for swinging movements laterally of the shoe, means for bending the ends of the binder toward the shoe bottom in response to the bodily movement of said fingers, a member movable heightwise of the shoe to impart such bodily movement to the fingers and provided with means for swinging the fingers away from the binder by further movement in the same direction, and driving means movable heightwise of the shoe to force the bent ends of the binder into the shoe bottom.

24. In a lasting machine, means for gathering the margin of the toe-end portion of an upper over the bottom of a last, means for applying a binder in position to hold the gathered margin of the upper, fingers movable bodily heightwise of the shoe to bend the end portions of the binder away from the shoe bottom after the binder has been thus applied and mounted also for swinging movements laterally of the shoe, means for bending the ends of the binder toward the shoe bottom in response to the bodily movement of said fingers, a member movable heightwise of the shoe to impart such bodily movement to the fingers and provided with means for swinging the fingers away from the binder by further movement in the same direction, spring-operated driving means movable heightwise of the shoe to force the bent ends of the binder into the shoe bottom, and a latch arranged to hold said driving means normally retracted and to be operated to release said means by still further movement of said member in the same direction.

25. In a lasting machine, means for gathering the margin of the toe-end portion of an upper over the bottom of a last, members mounted for swinging movements to bend a wire binder partially around the gathered margin of the upper, said members having grooves therein arranged to aline with each other when the members are in their initial positions, means for feeding binder wire into said grooves, and a device between said members arranged to aline with said grooves to receive the wire when it is fed and provided with means for clamping the wire yieldingly to control it.

26. In a lasting machine, means for gathering the margin of the toe-end portion of an upper over the bottom of a last, members mounted for bodily movements lengthwise of the shoe and also for swinging movements to apply a wire binder partially around the gathered margin of the upper, means for feeding binder wire to said members when they are in their initial positions, and a device between said members arranged to receive the wire when it is fed and to clamp the wire yieldingly, said device being movable lengthwise of the shoe with said members.

27. In a lasting machine, means for gathering the margin of the toe-end portion of an upper over the bottom of a last, means movable lengthwise of the shoe for applying a wire binder to the gathered margin of the upper, means for feeding binder wire to said binder-applying means, and mechanism automatically operative in the movement of said binder-applying means lengthwise of the shoe to sever from the wire a portion to serve as a binder.

28. In a lasting machine, means for gathering the margin of the toe-end portion of an upper over the bottom of a last, members mounted for swinging movements relatively to each other to bend a wire binder partially around the gathered margin of the upper, a carrier movable to carry said members also bodily lengthwise of the shoe, means for feeding binder wire to said members prior to the movement of said carrier, and mechanism operative in response to the movement of said carrier to sever from the wire a portion to serve as a binder.

29. In a lasting machine, means for gathering the margin of the toe-end portion of an upper over the bottom of a last, members mounted for swinging movements relatively to each other to bend a wire binder partially around the gathered margin of the upper, means for feeding binder wire to said members prior to their swinging movements, a guide for the wire arranged to occupy a position in the path of movement of one of said members, means for severing from the wire a portion to serve as a binder, and means for thereafter retracting said guide to permit the swinging of said members.

30. In a lasting machine, means for gathering the margin of the toe-end portion of an upper over the bottom of a last, members mounted for swinging movements relatively to each other to bend a wire binder partially around the gathered margin of the upper, means for feeding binder wire to said members prior to their swinging movements, a guide for the wire arranged to occupy a position in the path of movement of one of said members, means for cutting the wire at a point between the ends of said guide to provide a portion to serve as a binder, and means for thereafter imparting to said guide a retractive movement lengthwise of the shoe to clear the binder.

31. In a lasting machine, means for gathering the margin of the toe-end portion of an upper over the bottom of a last, members mounted for swinging movements to bend a wire binder partially around the gathered margin of the upper, a carrier movable lengthwise of the shoe and on which said members are mounted, means for feeding binder wire to said members, a guide for the wire movably mounted on said carrier, means for severing from the wire a portion to serve as a binder, and mechanism operative in response to the movement of said carrier to impart to said guide a retractive movement away from said members.

32. In a lasting machine, wipers for wiping the marginal portion of an end of an upper inwardly over the bottom of a last, mechanism movable inwardly between said wipers and the bottom of the last to apply a binder in position to hold the upper, and automatic means for effecting relative movement of said wipers and the last heightwise of the last to provide room for said binder-applying mechanism.

33. In a lasting machine, wipers for wiping the marginal portion of the toe end of an upper inwardly over the bottom of a last, mechanism movable inwardly between said wipers and the bottom of the last to apply a binder in position to hold the upper, a shoe rest arranged to engage the bottom of the forepart of the shoe, and means for operating said shoe rest in automatically determined time relation to the movements of said wipers to move the forepart of the last heightwise away from the wipers and thus to provide room between the wipers and the last for the binder-applying mechanism.

34. In a lasting machine, wipers for wiping the marginal portion of an end of an upper inwardly over the bottom of a last, mechanism movable inwardly between said wipers and the bottom of the last to apply a binder in position to hold the upper, means for effective relative movement of said wipers and the last heightwise of the last to provide room for the binder-applying mechanism, and additional means for pressing the portion of the upper wiped inwardly by said wipers close to the bottom of the last in the binder-applying operation.

35. In a lasting machine, wipers for wiping the marginal portion of an end of an upper inwardly over the bottom of a last, mechanism movable inwardly between said wipers and the bottom of the last to apply a binder in position to hold the upper, means for effecting relative movement of said wipers and the last heightwise of the last to provide room for the binder-applying mechanism, and an auxiliary wiper movable with said binder-applying mechanism for pressing the portion of the upper wiped inwardly by said wipers close to the bottom of the last in the binder-applying operation.

36. In a lasting machine, wipers for wiping the marginal portion of an end of an upper inwardly over the bottom of a last, mechanism movable inwardly between said wipers and the bottom of the last to apply a binder in position to hold the upper, means for effecting relative movement of said wipers and the last heightwise of the last to provide room for the binder-applying mechanism, and a flexible wiper plate having a substantially V-shaped recess therein at its upper-engaging edge and movable lengthwise of the shoe with said binder-applying mechanism to press the portion of the upper wiped inwardly by said wipers close to the bottom of the last in the binder-applying operation.

37. In a lasting machine, wipers for wiping the marginal portion of an end of an upper inwardly over the bottom of a last, said wipers comprising a single end wiper plate movable lengthwise of the shoe and formed to extend along opposite sides of the overwiped margin of the upper and side wiper plates movable rectilinearly widthwise of the shoe and arranged to overlap said end wiper plate in a plane substantially parallel to the shoe bottom.

38. In a lasting machine, wipers for gathering the margin of the toe end of an upper over the bottom of a last, said wipers comprising an end wiper plate movable lengthwise of the shoe and having portions in fixed relation to each other for engaging the upper respectively at the opposite sides of the shoe bottom and side wiper plates movable widthwise of the shoe and arranged to overlap said end wiper plate in a plane substantially parallel to the shoe bottom, said end and side wiper plates being so formed as substantially to inclose the gathered margin of the upper on all sides at the end of their operative movements.

39. In a lasting machine, wipers for gathering the margin of the toe end of an upper over the bottom of a last, said wipers comprising an end wiper plate movable lengthwise of the shoe and side wiper plates movable widthwise of the shoe and arranged to overlap said end wiper plate in a plane substantially parallel to the shoe bottom, said end wiper plate having a substantially V-shaped recess therein to receive the margin of the upper and the side wiper plates having therein recesses arranged to cooperate with the recess in the end wiper plate to gather the margin of the upper within an area substantially midway between the opposite sides of the toe.

40. In a lasting machine, wipers for gathering the margin of the toe end of an upper over the bottom of a last, said wipers comprising an end wiper plate movable rectilinearly lengthwise of the shoe and having a substantially V-shaped recess therein to receive the margin of the upper and side wiper plates movable rectilinearly widthwise of the shoe in overlapping relation to said end wiper plate and formed to cooperate with the end wiper plate substantially to inclose the gathered margin of the upper on all sides at the end of the operative movements of the plates.

41. In a lasting machine, wipers for wiping the marginal portion of an end of an upper inwardly over the bottom of a last, said wipers comprising an end wiper plate movable lengthwise of the shoe and side wiper plates movable widthwise of the shoe in overlapping relation to said end wiper plate, a slide movable heightwise of the shoe, mechanism controlled by said slide for operating the end wiper plate, and cam means carried by said slide for operating the side wiper plates.

BERNHARDT JORGENSEN.

CERTIFICATE OF CORRECTION.

Patent No. 2,040,138.  May 12, 1936.

BERNHARDT JORGENSEN.

It is hereby certified that error appears in the printed specification of the above numbered patent requiring correction as follows: Page 5, first column, line 65, before "bearing" insert the word another; page 11, second column, line 11, claim 34, for "effective" read effecting; and that the said Letters Patent should be read with these corrections therein that the same may conform to the record of the case in the Patent Office.

Signed and sealed this 8th day of September, A. D. 1936.

Leslie Frazer

Acting Commissioner of Patents.

(Seal)